(12) United States Patent
Akino

(10) Patent No.: US 9,584,888 B2
(45) Date of Patent: Feb. 28, 2017

(54) MICROPHONE AND MICROPHONE CASING

(71) Applicant: Hiroshi Akino, Tokyo (JP)

(72) Inventor: Hiroshi Akino, Tokyo (JP)

(73) Assignee: Kabushiki Kaisha Audio-Technica, Tokyo (JP)

( * ) Notice: Subject to any disclaimer, the term of this patent is extended or adjusted under 35 U.S.C. 154(b) by 0 days.

(21) Appl. No.: 14/876,179

(22) Filed: Oct. 6, 2015

(65) Prior Publication Data
US 2016/0192045 A1    Jun. 30, 2016

(30) Foreign Application Priority Data

Dec. 25, 2014    (JP) .................................. 2014-261727

(51) Int. Cl.
| | |
|---|---|
| *H04R 9/08* | (2006.01) |
| *H04R 1/02* | (2006.01) |
| *H04R 25/00* | (2006.01) |
| *H04M 1/03* | (2006.01) |
| *H04R 1/04* | (2006.01) |

(52) U.S. Cl.
CPC ............... *H04R 1/02* (2013.01); *H04M 1/035* (2013.01); *H04R 1/04* (2013.01); *H04R 2410/00* (2013.01)

(58) Field of Classification Search
USPC ........................................ 381/189, 356, 358
See application file for complete search history.

(56) References Cited

U.S. PATENT DOCUMENTS

2010/0189298 A1*  7/2010  Akino ................... H04M 1/035
                                                                 381/356

FOREIGN PATENT DOCUMENTS

JP                   5162484           12/2012

* cited by examiner

*Primary Examiner* — Sunita Joshi
(74) *Attorney, Agent, or Firm* — Whitham, Curtis & Cook, P.C.

(57) ABSTRACT

A microphone includes a microphone unit having a diaphragm vibrating in response to sound. The microphone unit converts the sound into an electrical signal. A cylindrical casing contains the microphone unit. A metal mesh strip rounded along the inner surface of the casing is attached to the inner surface of the main wall of the casing so as to cover openings. The rounded metal mesh strip has a spring portion generating spring force to expand the metal mesh strip against the inner surface of the casing to provide electrostatic shielding.

14 Claims, 7 Drawing Sheets

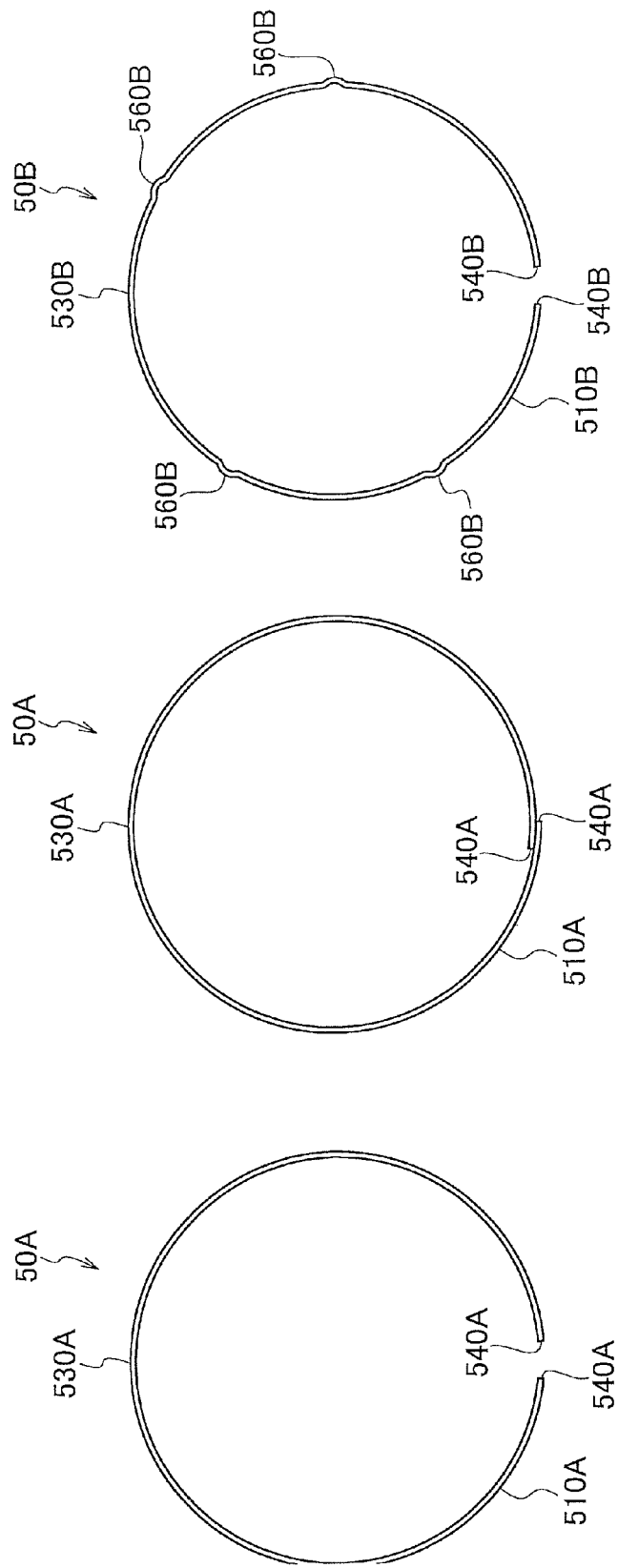

MICROPHONE AND MICROPHONE CASING

TECHNICAL FIELD

The present invention relates to a microphone and a microphone casing.

BACKGROUND ART

For example, a typical unidirectional condenser microphone picks up sound from two directions, i.e., from the front and back of its diaphragm. Accordingly, the casing containing a microphone unit should have openings in its front and main walls.

In the vicinity of the openings in the main wall of the casing, a pathway is provided to send audio signals from the microphone unit to an impedance converter. In such a configuration, the vicinity of the openings in the main wall of the casing is susceptible to noise due to the electrostatic coupling in this pathway. To reduce the effect of the noise due to electrostatic coupling in the vicinity of the openings in the main wall of the casing, the microphone has an electrostatic shield, such as a metal mesh, at the openings.

The openings in the casing of the microphone require high electrostatic-shielding performance while effectively picking up sound. For this reason, the metal mesh strip is attached to the casing so as to entirely cover the openings while sufficient aperture is ensured. The metal mesh strip is composed of a cylindrical metal strip rounded along the main wall of the casing and fixed inside the casing with an adhesive or any other fixer.

Unfortunately, this metal mesh strip inside the casing barely covers the openings due to its variations in size and directional or positional misalignment inside the casing, leading to low electrostatic-shielding performance.

For example, Japanese Patent No. 5162484, hereinafter referred to as Patent Document 1) discloses a microphone that has a shield plate with tongues at both ends of the microphone in the longitudinal direction, and the tongues at one end overlap the tongues at the other end alternately to form a cylindrical shape.

The technique disclosed in Patent Document 1 barely overlaps tongues inside the casing and entirely covers the openings with the shield plate inside the casing, thereby leading to low electrostatic-shielding performance.

SUMMARY OF INVENTION

Technical Problem

An object of the present invention is to provide a microphone having high electrostatic-shielding performance with a simple configuration.

Solution to Problem

A microphone according to an embodiment of the invention includes a microphone unit having a diaphragm vibrating in response to sound and converting the sound into an electrical signal; a cylindrical casing containing the microphone unit; openings in the main wall of the casing; and a metal mesh strip rounded along the inner surface of the casing and attached to the inner surface of the main wall so as to cover the openings of the casing, the rounded metal mesh strip having a spring portion generating spring force to expand the metal mesh strip.

BRIEF DESCRIPTION OF DRAWINGS

FIG. 7A illustrates a metal mesh strip of a related art before attachment to a casing, seen from the front of the microphone.

FIG. 7B illustrates the metal mesh strip of the related art being attached to the casing.

FIG. 7C illustrates a metal mesh strip of another related art before attachment to a casing, seen from the front of the microphone.

DESCRIPTION OF EMBODIMENTS

A microphone and a microphone casing according to an embodiment of the present invention will now be described with reference to the attached drawings.

Figure 1:
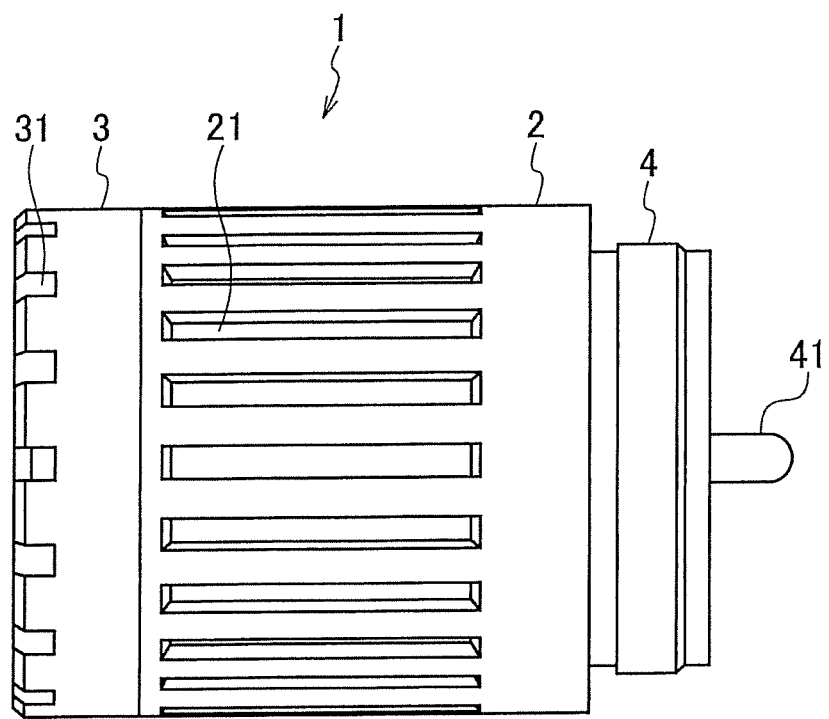
FIG. 1 is a side view of a microphone according to an embodiment of the invention.

As shown in FIG. 1, a microphone 1 according to the embodiment includes a cylindrical casing 2 containing a microphone unit and a front cover 3 provided at one open end of the casing 2. The casing 2 and front cover 3 constitute a microphone casing. The microphone 1 also includes a connector 4 at the other open end of the casing 2.

The side in which the front cover 3 of the casing 2 is attached (the left side in FIG. 1) is the front of the microphone 1, and the opposite side in which the connector 4 is provided (the right side in FIG. 1) is the back of it.

The casing 2 has a cylindrical shape to contain the microphone unit. The casing 2 is hollow and has two open ends. The casing 2 is composed of metal or any other conductive material to shield the microphone unit from external electrostatic fields. The casing 2 needs to receive sound at the back of a diaphragm, and thus has openings (slits) 21 on the main wall. The openings 21 are uniformly provided in the main wall of the casing 2 so as to receive sound evenly at the back of the diaphragm. In particular, the openings 21 have the same shape and are disposed in the outer surface of the casing 2 at regular intervals.

The connector 4 is provided at the open end in the back of the casing 2. The connector 4 is a component for electrically connecting the microphone 1 to another device. The connector 4 is provided with a connector pin 41 for electrically connecting the connector 4 to the corresponding connector in the other device.

Figure 2:
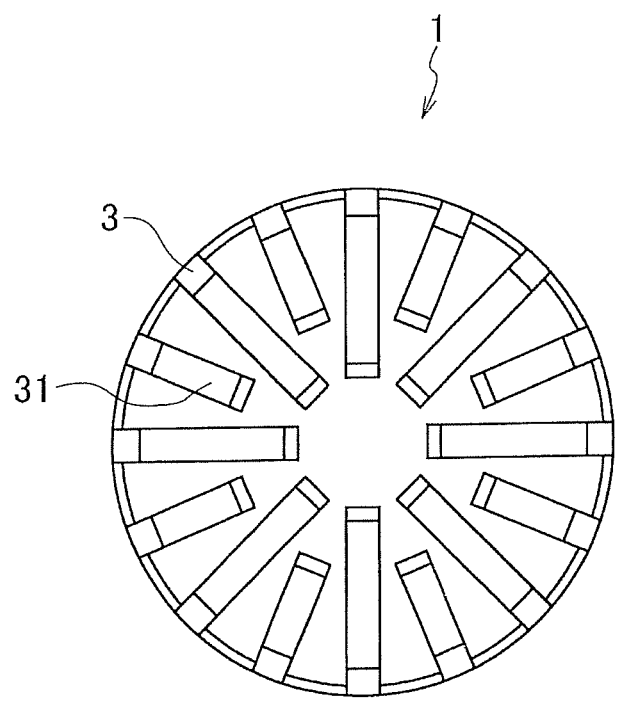
FIG. 2 is a front view of the microphone in FIG. 1.

As shown in FIG. 2, the open end in the front of the casing 2 is provided with the front cover 3 that covers the open end and the microphone unit inside the casing 2. The front cover 3 is composed of metal or any other conductive material to shield the microphone unit from external electrostatic fields. The front cover 3 needs to receive sound at the front of a diaphragm, and thus the front cover 3 has openings (slits) 31. The openings 31 are uniformly provided in the front cover 3 so as to receive sound evenly at the front of the diaphragm.

Figure 3:
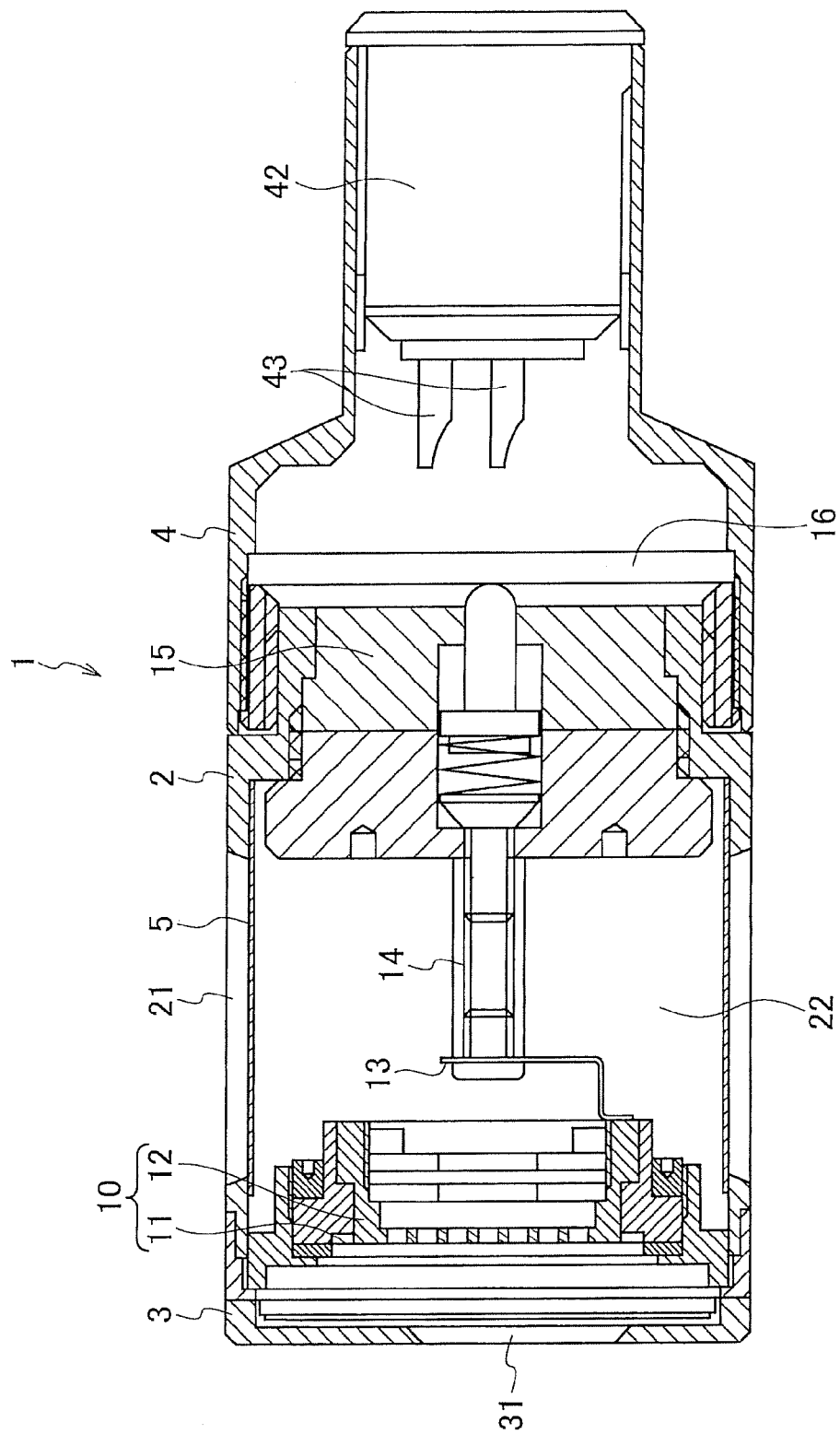
FIG. 3 is a sectional view of the microphone in FIG. 1.

The configuration of the microphone 1 will be specifically described with reference to the cross-sectional view of FIG. 3. The microphone 1 includes a microphone unit 10 that is disposed in the casing 2 to convert sound into an electrical audio signal and output it. The microphone 1 includes an output terminal strip 13 and an extraction electrode rod 14 in the casing 2, for transmitting the audio signal from the microphone unit 10 to an impedance converter. An air chamber 22 is defined around the output terminal strip 13 and the extraction electrode rod 14 inside the casing 2. The microphone unit 10 is housed in the front side of the casing 2. The microphone unit 10 includes a diaphragm 11 and a fixed pole 12 to convert sound into an audio signal and output it. The open back end of the casing 2 is sealed with an insulating material 15. The extraction electrode rod 14 electrically connected to the fixed pole 12 is inserted into the center of the insulating material 15.

The microphone 1 includes a circuit substrate 16 that is inside the connector 4 and is provided with desired electronic circuits, such as an impedance converter, thereon. The circuit substrate 16 is electrically connected to the microphone unit 10 through an electrode that is formed in its center and is in contact with the extraction electrode rod 14. The circuit substrate 16 contains electronic components for performing predetermined processing, such as impedance conversion, low-cut processing, and amplification. The circuit substrate 16 has circuit patterns required for performing the processing described above with the electronic components.

The circuit substrate 16 is connected to output terminals 43 of a connector unit 42 with lead lines (not shown). An output signal from the circuit substrate 16 is transmitted to the output terminals 43 through the lead lines.

The openings 31 in the front cover 3 of the microphone 1 transmit sound from the front of the microphone 1 to the front of the diaphragm 11. A front acoustic terminal in front of the openings 31 is defined in the center position of air vibrating simultaneously with the diaphragm 11.

The openings 21 in the casing 2 of the microphone 1 transmit sound from the back of the microphone 1 to the back of the diaphragm 11 via the air chamber 22. A rear acoustic terminal in front of the openings 21 is defined in the center position of air vibrating simultaneously with the diaphragm 11.

A metal mesh strip 5 is attached to the inner surface of the main wall of the casing 2 so as to entirely cover the openings 21. As described above, in the vicinity of the openings 21 in the casing 2, a pathway is provided to send an audio signal from the microphone unit 10 to the impedance converter on the circuit substrate 16. To reduce the effect of the noise due to electrostatic coupling in the pathway in the vicinity of the openings 21, the openings 21 are provided with the metal mesh strip 5 covering the pathway to be electrostatically shielded.

Figure 4:
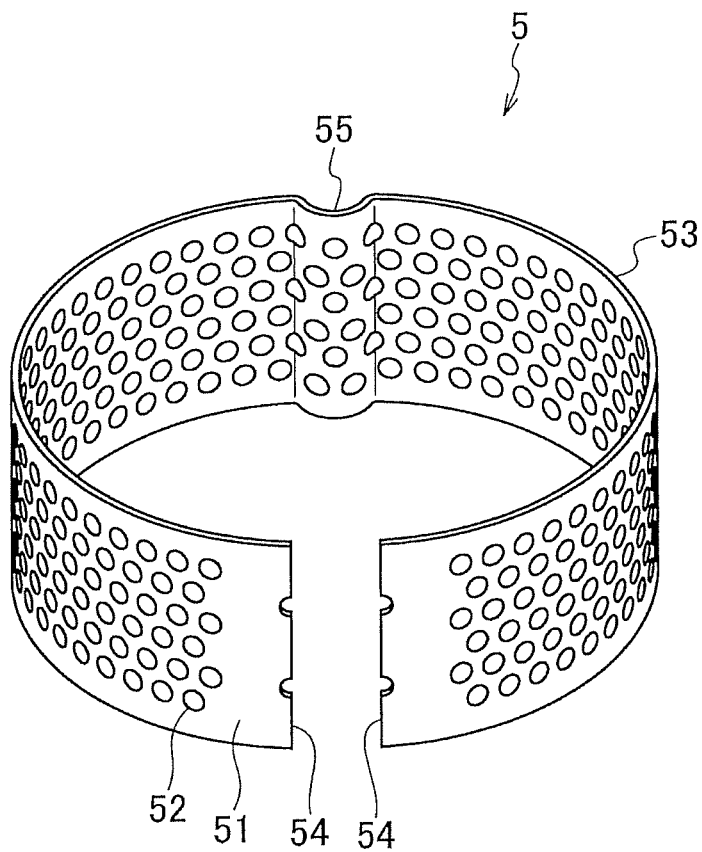
FIG. 4 is a perspective view of a metal mesh strip of the microphone in FIG. 1.
Figure 5:
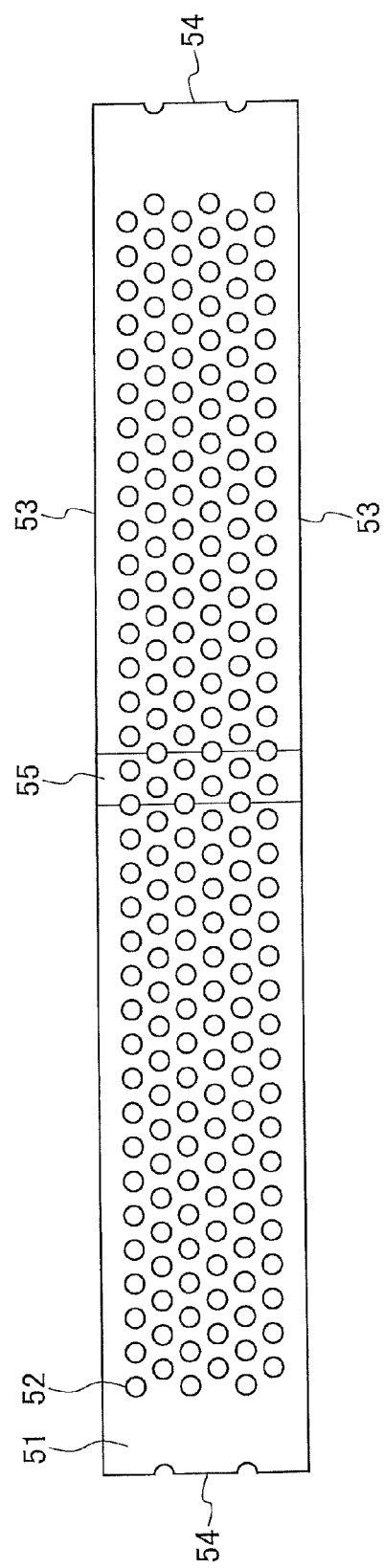
FIG. 5 is a development view of the metal mesh strip in FIG. 4.

The configuration of the metal mesh strip 5 will be described in more detail, with reference to the perspective view of FIG. 4 and the development view of FIG. 5.

The metal mesh strip 5 has a mesh body 51, which is a thin metal strip having long sides 53 and short sides 54 and is cylindrically rounded along the side shape of the cylindrical casing 2. The mesh body 51 is an elastic body, the entire of which provides elastic force. The metal mesh strip 5 has a large number of holes 52 drilled through the mesh body 51 and a spring portion 55 provided in a portion of the mesh body 51. The metal mesh strip 5 is positioned in such a manner that the long sides 53 extend along the peripheral direction of the main wall of the casing 2 and the short sides 54 face each other inside the casing 2. The length of the long side 53 of the metal mesh strip 5 is longer than that of the internal circumference of the casing 2 such that the long sides 53 extend along the inner side of the main wall of the casing 2 while the metal mesh strip 5 has the spring portion 55.

The spring portion 55 is part of the metal mesh strip 5 protruding inward, thereby providing spring force outward (an expanding direction of the metal mesh strip 5). According to the embodiment, such part of the metal mesh strip 5 is in the center of the metal mesh strip 5 along the longitudinal direction. The spring portion 55 protrudes inward along one of the two sides of the metal mesh strip 5, i.e., the width direction, forming a semi-cylindrical shape. The spring portion 55 should have a shape that provides spring force so as to expand the metal mesh strip 5. The spring portion 55 thus should not be limited to the semi-cylindrical segment shown in FIG. 4, but may be cornered, for instance.

The metal mesh strip 5 requires high electrostatic-shielding performance while the openings 21 of the casing 2 efficiently picks up sound, and thus needs to be attached so as to entirely cover the openings 21.

Figure 6C:
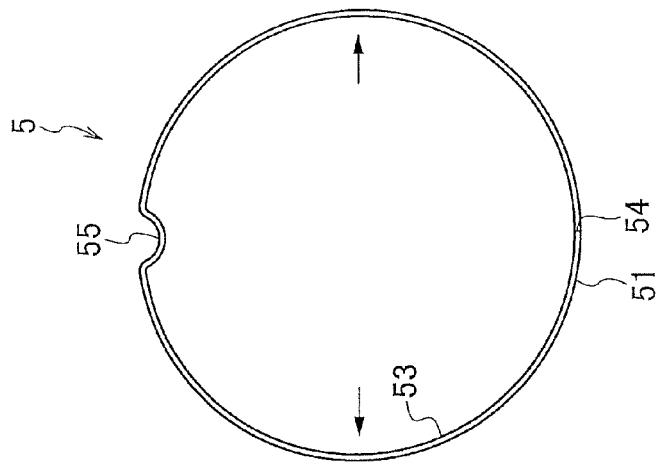
FIG. 6C illustrates the metal mesh strip after attachment to the casing.
Figure 6B:
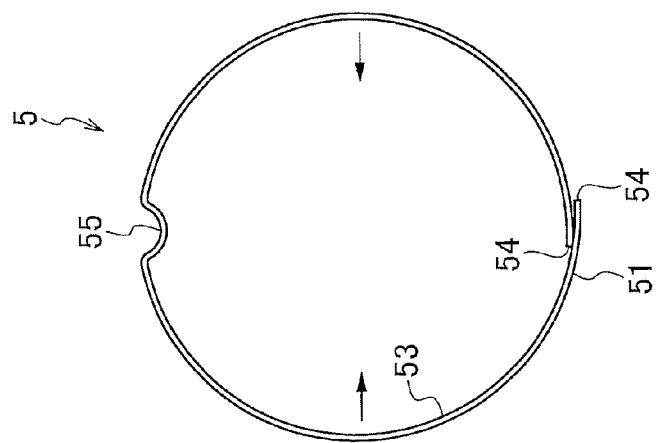
FIG. 6B illustrates the metal mesh strip being attached to the casing.
Figure 6A:
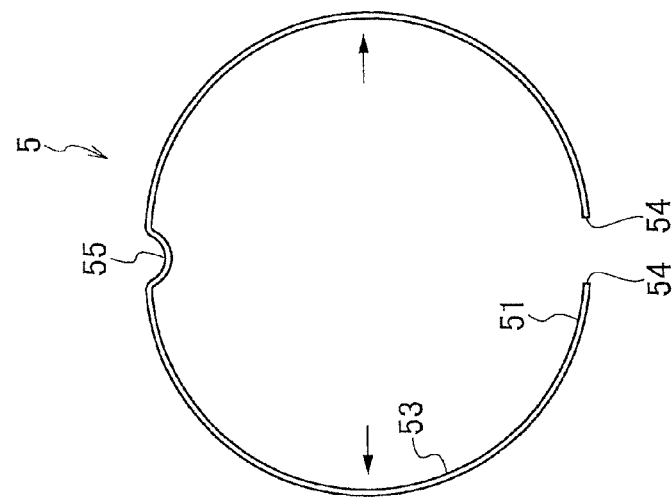
FIG. 6A illustrates the metal mesh strip before attachment to a casing, seen from the front of the microphone.

The action of the metal mesh strip 5 attached to the casing 2 will now be mainly described, with reference to FIGS. 6A, 6B, and 6C.

FIG. 6A illustrates the metal mesh strip 5 before attachment to the casing 2 as seen from the front of the microphone 1. As shown in FIG. 6A, the metal mesh strip 5 expands outward (in the arrow direction in FIG. 6A) by the action of the spring portion 55 before being attached to the casing 2, and the both short sides 54 are separated.

FIG. 6B illustrates the metal mesh strip 5 during attachment to the casing 2. As shown in FIG. 6B, the radial dimension of the metal mesh strip 5 is reduced by applying force from the outside (in the arrow direction in FIG. 6B) such that the metal mesh strip 5 is attached to the inner surface of the casing 2. The outer diameter of the metal mesh strip 5 at this time is smaller than the inner diameter of the casing 2. This causes the end portions of the mesh body 51 near the short sides 54 of the metal mesh strip 5 overlap with each other.

FIG. 6C illustrates the metal mesh strip 5 after attachment to the casing 2. In the metal mesh strip 5 shown in FIG. 6C, removal of the force applied from the outside to the inside generates force in the opposite direction (the force applied from the inside to the outside, the arrow direction in FIG. 6C) to that shown in FIG. 6B, so that the mesh body 51 comes into close contact with the inner surface of the casing 2. The spring portion 55 adjusts the circumferential length of the metal mesh strip 5 such that the circumferential length of the long side 53 of the metal mesh strip 5 is shorter than that of the main wall of the casing 2. This readily matches the length of the long side 53, including the overlap between the end portions of the spring portion 55, to the circumferential length of the inner surface of the casing 2 in the metal mesh strip 5. Two ends (i.e., the both short sides 54) of the metal mesh strip 5 come into contact with each other. The metal mesh strip 5 in FIG. 6C is fixed to the inner surface of the casing 2, for example, with an adhesive.

With such a configuration of the microphone 1, the openings 21 in the main wall of the casing 2 can be entirely covered with the metal mesh strip 5, and preferred contact can be kept between the inner surface of the casing 2 and the metal mesh strip 5. Thus, the microphone 1 provides high electrostatic-shielding performance for the microphone unit 10.

Metal mesh strips 50A and 50B of a related art shown in FIGS. 7A, 7B, and 7C will now be described. In contrast to the metal mesh strip 5 in the casing 2 of the microphone 1 according to the above-described embodiment, the metal mesh strips 50A and 50B of the related art lack the spring portion 55.

In the metal mesh strip 50A shown in FIG. 7A, a mesh body 510A is rounded along the inner surface of the casing 2, but lacks the spring portion 55 unlike the metal mesh strip 5 according to the embodiment. The metal mesh strip 50A thus generates no spring force from the inside to the outside. Even if the length of the long side 530A matches the circumferential length of the side of the casing 2, the metal mesh strip 50A causes a shortage of a tension against the inner side of the casing 2. The metal mesh strip 50A thus barely covers the entire openings 21 in the main wall of the casing 2 due to its variations in size and directional or positional misalignment inside the casing.

As illustrated in FIG. 7B, the metal mesh strip 50A fails to absorb the difference in length between the long side 530A and the circumference of the side of the casing 2 if the former is longer than the latter, due to the lack of the spring portion 55 unlike the metal mesh strip 5 according to the embodiment. The metal mesh strip 50A thus barely achieves high electrostatic-shielding performance, because the end portions near the short sides 540A of the mesh body 510A remain overlapped when the metal mesh strip 50A is attached to the inner surface of the casing 2.

A metal mesh strip 50B of another related art shown in FIG. 7C is provided with projections 560B projected outward, at appropriate positions of the mesh body 510B. The projections 560B are provided to enhance the electrostatic-shielding performance by improving the state of the contact between the inner side of the casing 2 and the metal mesh strip 50B. Unfortunately, the metal mesh strip 50B barely comes into contact with the inner side of the casing 2 at the portion other than the projections 560B, leading to low electrostatic-shielding performance.

In contrast, the metal mesh strip 5 according to the above-described embodiment has the spring portion 55 to be in close contact with to the inner surface of the casing 2 with the appropriate tension, and thus can accurately cover the openings 21 and achieve high electrostatic-shielding performance.

In addition, the embodiment of the invention is not limited to the above-described embodiment, but various modifications may be made without departing from the gist of the invention. For example, a number of the spring portions 55 may be provided at regular or given intervals. Although the short sides 54 comes into contact with each other at the cross sections in FIG. 6C, some plane areas near the short sides 54 of the metal mesh strip 5 may overlap with each other to be in contact with each other.

As described above, the embodiment can provides the microphone that achieves high electrostatic-shielding performance with a simple configuration.

The invention claimed is:

1. A microphone comprising:
 a microphone unit comprising a diaphragm vibrating in response to sound, the microphone unit converting the sound into an electrical signal;
 a cylindrical casing containing the microphone unit having openings in a main wall of the casing; and
 a metal mesh strip rounded along and attached to the inner surface of the main wall of the cylindrical casing so as to cover the openings, the rounded metal mesh strip having a spring portion generating spring force to expand the metal mesh strip against the main wall of the casing to provide electrostatic shielding,
 wherein the spring portion protrudes inwardly in the middle of the metal mesh strip.

2. The microphone of claim 1, wherein the length of a long side of the metal mesh strip is longer than the circumferential length of the inner surface of the cylindrical casing.

3. The microphone of claim 1, wherein the spring portion protrudes inwardly along a short side of the metal mesh strip.

4. The microphone of claim 1, wherein the metal mesh strip covers a pathway to send the electrical signal from the microphone unit in the cylindrical casing.

5. The microphone of claim 1, wherein two ends of the metal mesh strip are in contact with each other because of spring force of the spring portion.

6. The microphone of claim 1, wherein two ends of the metal mesh strip are separated in the longitudinal direction before attachment to the cylindrical casing.

7. The microphone of claim 1, wherein the spring portion is a semi-cylindrical segment.

8. A microphone casing containing a microphone unit comprising a diaphragm vibrating in response to sound, the microphone unit converting the sound into an electrical signal, wherein:
 the microphone casing is a cylindrical casing;
 a main wall of the casing has openings; and
 the microphone casing comprises a metal mesh strip rounded along and attached to the inner surface of the main wall of the cylindrical casing so as to cover the openings, the rounded metal mesh strip having a spring portion generating spring force to expand the metal mesh strip against the main wall of the casing to provide electrostatic shielding, and
 wherein the spring portion protrudes inwardly in the middle of the metal mesh strip.

9. The microphone casing of claim 8, wherein the length of a long side of the metal mesh strip is longer than the circumferential length of the inner surface of the cylindrical casing.

10. The microphone casing of claim 8, wherein the spring portion protrudes inwardly along a short side of the metal mesh strip.

11. The microphone casing of claim 8, wherein the metal mesh strip covers a pathway to send the electrical signal from the microphone unit in the cylindrical casing.

12. The microphone casing of claim 8, wherein two ends of the metal mesh strip are in contact with each other because of spring force of the spring portion.

13. The microphone casing of claim 8, wherein two ends of the metal mesh strip are separated in the longitudinal direction before attachment to the cylindrical casing.

14. The microphone casing of claim 8, wherein the spring portion is a semi-cylindrical segment.

* * * * *